(12) United States Patent
Urano et al.

(10) Patent No.: US 7,420,558 B2
(45) Date of Patent: Sep. 2, 2008

(54) INFORMATION PROCESSING APPARATUS AND METHOD, PROGRAM, AND NAVIGATION APPARATUS

(75) Inventors: Izumi Urano, Tokyo (JP); Natsuo Koda, Kanagawa (JP)

(73) Assignee: Sony Corporation (JP)

( * ) Notice: Subject to any disclaimer, the term of this patent is extended or adjusted under 35 U.S.C. 154(b) by 115 days.

(21) Appl. No.: 11/242,945

(22) Filed: Oct. 5, 2005

(65) Prior Publication Data

US 2006/0087507 A1    Apr. 27, 2006

(30) Foreign Application Priority Data

Oct. 25, 2004    (JP)    ............... 2004-309460

(51) Int. Cl.
*G06T 15/00*    (2006.01)
*G01C 21/00*    (2006.01)

(52) U.S. Cl. ...................... 345/427; 701/200

(58) Field of Classification Search .................. 345/427
See application file for complete search history.

(56) References Cited

U.S. PATENT DOCUMENTS

| | | | | |
|---|---|---|---|---|
| 3,736,564 | A * | 5/1973 | Watkins | 345/421 |
| 5,751,927 | A * | 5/1998 | Wason | 345/419 |
| 6,061,066 | A * | 5/2000 | Priem | 345/427 |
| 6,169,552 | B1 * | 1/2001 | Endo et al. | 345/427 |
| 6,191,794 | B1 * | 2/2001 | Priem et al. | 345/582 |
| 6,480,192 | B1 * | 11/2002 | Sakamoto et al. | 345/419 |
| 6,618,049 | B1 * | 9/2003 | Hansen | 345/423 |
| 6,628,284 | B1 * | 9/2003 | Fossum et al. | 345/427 |
| 6,710,774 | B1 * | 3/2004 | Kawasaki et al. | 345/419 |
| 2001/0010517 | A1 * | 8/2001 | Iimura et al. | 345/426 |
| 2001/0026276 | A1 * | 10/2001 | Sakamoto et al. | 345/473 |
| 2002/0038181 | A1 * | 3/2002 | Okude et al. | 701/208 |
| 2002/0180734 | A1 * | 12/2002 | Endoh et al. | 345/428 |
| 2003/0055559 | A1 * | 3/2003 | Kuroda et al. | 701/208 |
| 2003/0189565 | A1 * | 10/2003 | Lindholm et al. | 345/418 |
| 2003/0189569 | A1 * | 10/2003 | Oka | 345/427 |
| 2004/0066376 | A1 * | 4/2004 | Donath et al. | 345/169 |
| 2004/0165776 | A1 * | 8/2004 | Brouwer | 382/181 |
| 2005/0140676 | A1 * | 6/2005 | Cho | 345/440 |
| 2006/0087507 | A1 * | 4/2006 | Urano et al. | 345/421 |

FOREIGN PATENT DOCUMENTS

| | | |
|---|---|---|
| JP | 06-90041 | 3/1994 |
| JP | 2000-122524 | 4/2000 |

OTHER PUBLICATIONS

Foley, James D.; van Dam, Andries; Feiner, Steven k.; Hughes, John F.; "Computer Graphics Principles and Practice;" 1996, Addison-Wesley Publishing Company; Second Edition; pp. 240-241.*

* cited by examiner

*Primary Examiner*—Ulka Chauhan
*Assistant Examiner*—Crystal Murdoch
(74) *Attorney, Agent, or Firm*—Rader Fishman & Grauer PLLC; Ronald P. Kananen

(57) ABSTRACT

An information processing apparatus for generating a three-dimensional image obtained by projecting a three-dimensional space onto a plane and determining a depth of a vertex of a polygon from a viewpoint in the three-dimensional space, the polygon forming a surface of a solid object from which the three-dimensional image is generated, and moving the position of the vertices by the amount of movement determined in accordance with the determined depth.

8 Claims, 14 Drawing Sheets

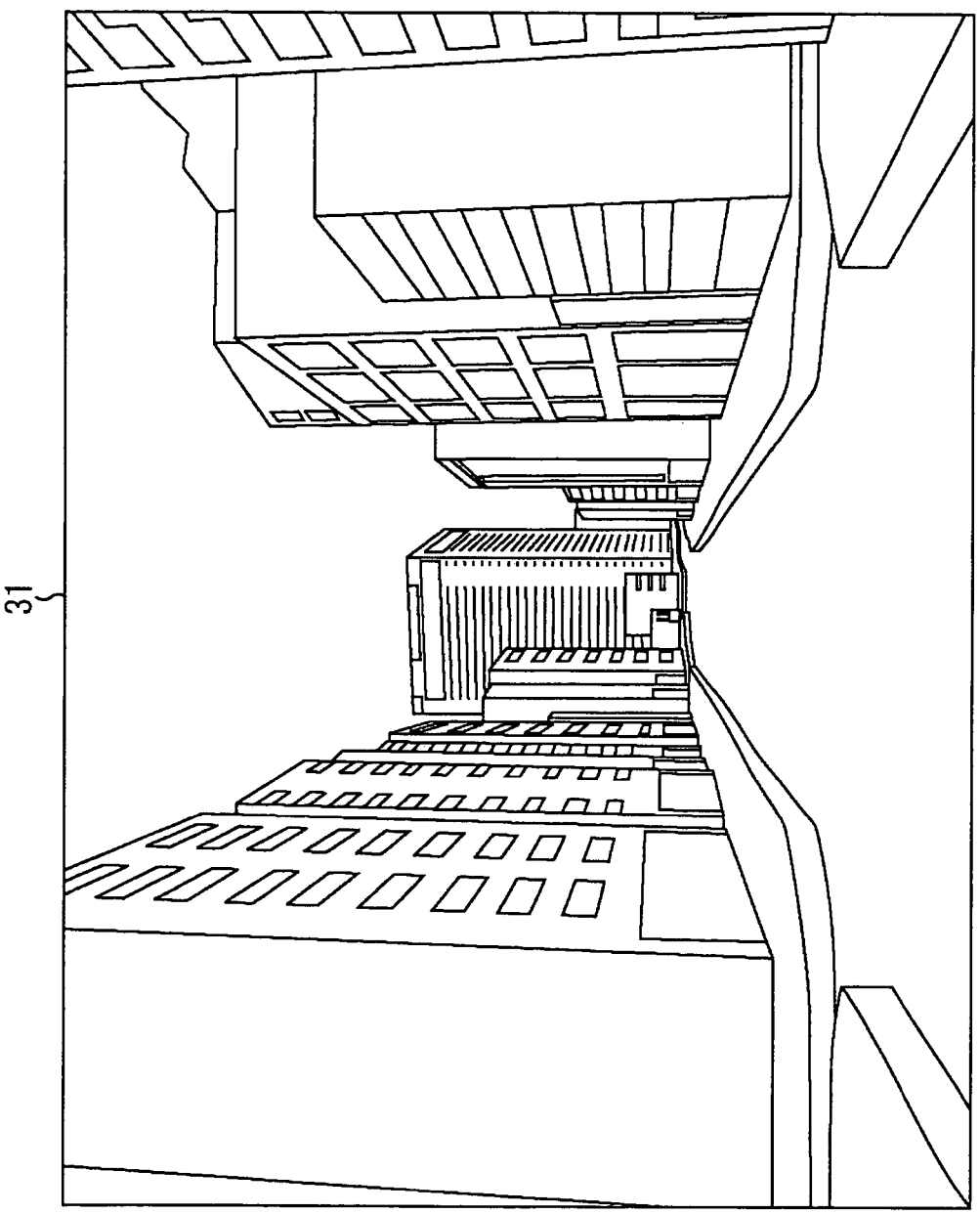

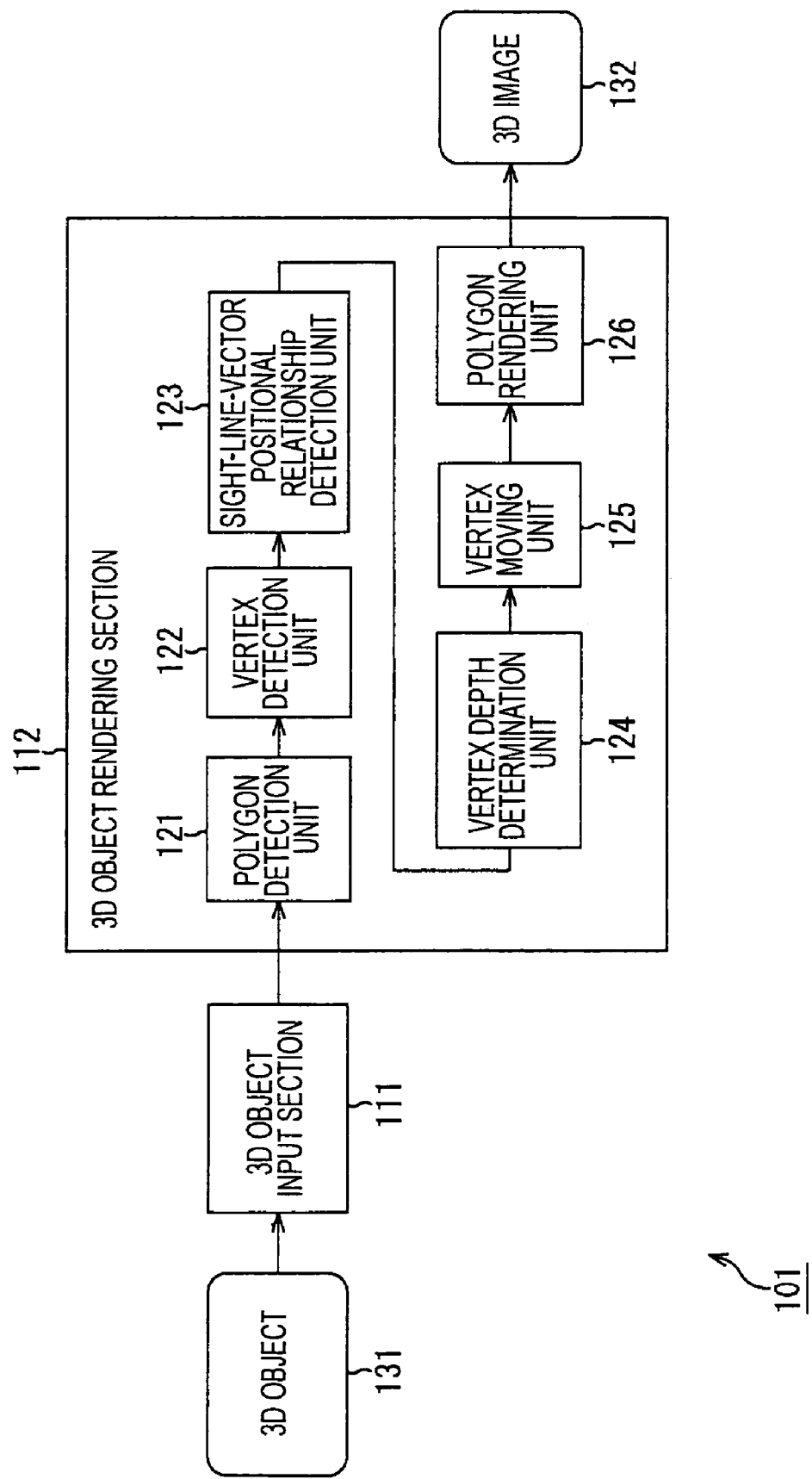

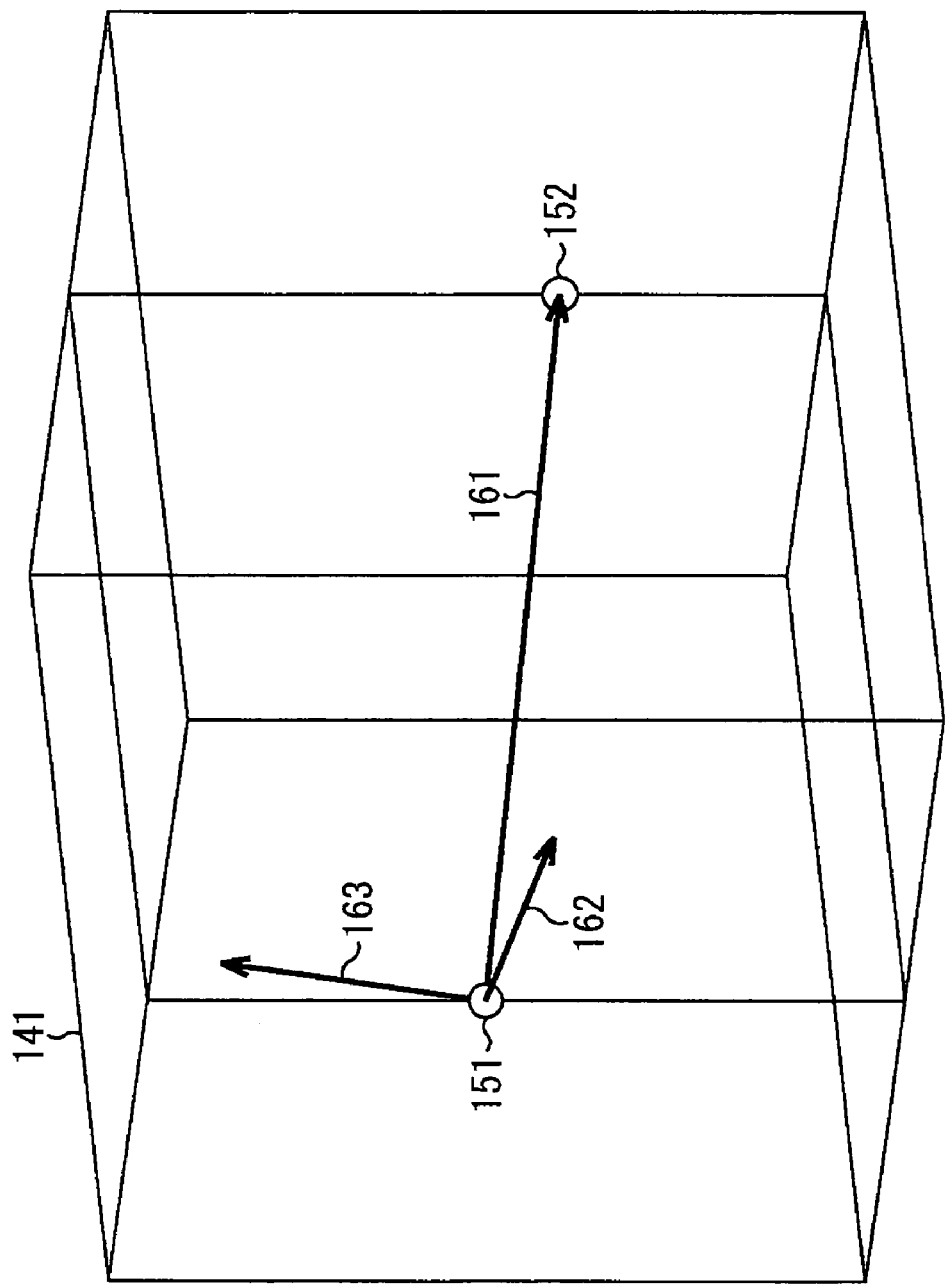

251

INFORMATION PROCESSING APPARATUS AND METHOD, PROGRAM, AND NAVIGATION APPARATUS

CROSS REFERENCES TO RELATED APPLICATIONS

The present invention contains subject matter related to Japanese Patent Application JP 2004-309460 filed in the Japanese Patent Office on Oct. 25, 2004, the entire contents of which are incorporated herein by reference.

BACKGROUND OF THE INVENTION

1. Field of the Invention

The present invention relates to information processing apparatuses, information processing methods, programs, and navigation apparatuses, and, more particularly, to an information processing apparatus, an information processing method, a program, and a navigation apparatus that are capable of providing, for example, three-dimensional (3D) images for which a viewing angle is controlled in accordance with a distance from a viewpoint.

2. Description of the Related Art

For example, stereoscopic images (3D images) in two dimensions that stereoscopically represent a 3D space have been available by, for example, projecting solid objects in the 3D space onto a plane. FIG. 1 shows an example of the structure of an image processing apparatus for generating such 3D images using coordinate information of a solid object in a 3D space.

Referring to FIG. 1, an image processing apparatus 1 includes a 3D object input section 11 and a 3D object rendering section 12. In FIG. 1, rectangles represent processors forming the image processing apparatus 1, and rounded-corner rectangles represent data input to or output from the processors.

The image processing apparatus 1 receives a 3D object 21, which is data representing a solid object in a 3D space, as an input. The data includes, for example, coordinate information of vertices. The image processing apparatus 1 generates a 3D image 22 based on the 3D object 21.

The 3D object input section 11 reads data (the 3D object 21) in which the structure of a solid object is described and converts the description contents into a scene graph including a 3D object hierarchy. The 3D object input section 11 supplies the scene graph to the 3D object rendering section 12.

The 3D object rendering section 12 generates a 3D image based on the scene graph. The 3D object rendering section 12 includes a polygon detection unit 13 and a polygon rendering unit 14. The polygon detection unit 13 detects a polygon from the received scene graph and supplies information of the polygon to the polygon rendering unit 14. The polygon rendering unit 14 projects vertices of the supplied polygon onto a 2D projection plane and renders the 3D image 22. The polygon rendering unit 14 outputs the 3D image 22 to the outside of the image processing apparatus 1.

FIG. 2 is a flowchart showing a specific 3D image process performed by the image processing apparatus 1. In other words, in step S1, the 3D object input section 11 reads the 3D object 21 supplied from the outside of the image processing apparatus 1, converts the 3D object 21 into a scene graph, and supplies the scene graph to the polygon detection unit 13 of the 3D object rendering section 12. In step S2, the polygon detection unit 13 performs polygon detection for detecting a polygon from the scene graph and supplies the detection result to the polygon rendering unit 14. In step S3, in accordance with the detection result, the polygon rendering unit 14 determines whether or not an unprocessed polygon exists in the scene graph. If it is determined that there is an unprocessed polygon, the process proceeds to step S4. In step S4, the polygon rendering unit 14 renders the polygon on a 2D projection plane in accordance with the scene graph. After the processing in step S4 is completed, the process returns to step S2. Then, the polygon rendering unit 14 repeats the subsequent processing for another polygon.

In other words, the polygon detection unit 13 and the polygon rendering unit 14 of the 3D object rendering section 12 operate to repeat the processing from steps S2 to S4 and to render all the polygons included in the scene graph on the 2D projection plane (render the 3D image 22). If it is determined in step S3 that there is no unprocessed polygon; the polygon rendering unit 14 outputs then the rendered 3D image 22 to the outside of the image processing apparatus 1 and terminates the 3D image process.

A method using such rendering processing for generating a 3D image of a road ahead on a road map viewed from the present location of a moving body and for showing the present location of the moving body using the 3D image is available. (See, for example, Japanese Examined Patent Application Publication No. 6-90041.) A 3D image 31 shown in FIG. 3 is generated using such a method. The 3D image 31 is one of the guide images used for, for example, a so-called car navigation system, and it represents the field of view of the driver of a vehicle. The 3D image 31 is rendered so as to be approximated to the view actually seen by the driver (user). Thus, the driver is able to intuitively (easily) understand a road guide image superimposed on the 3D image 31.

In the 3D image 31, in order to provide depth perception, an object is represented smaller in proportion to an increase in the distance from a viewpoint. In other words, in a 3D space, the greater the distance between an object and a viewpoint, the smaller the object is rendered. In contrast, the smaller the distance between an object and a viewpoint, the larger the object is rendered.

In other words, as shown in FIG. 4A, when a driver (vehicle) 41 travels in the direction of an arrow 42 on a road 43 located between buildings 44-1 to 44-3 and buildings 44-4 to 44-6 that are arranged so as to face each other with sides 43A and 43B therebetween, in the 3D image 31, an object farther away from the driver 41 is represented smaller and an object closer to the driver 41 is represented larger, as shown in FIG. 4B. Thus, in the 3D image 31, the distance between the sides 43A and 43B reduces in proportion to an increase in the distance from the driver 41. In addition, the buildings 44-1 to 44-6 are represented smaller in proportion to an increase in the distance from the driver 41.

However, 3D images generated based on such perspective are likely to cause, for example, wide-angle distortion or the like. (See, for example, Japanese Unexamined Patent Application Publication No. 2000-122524.) For example, for a 3D image rendered based on perspective, the circumference of the image (that is, an end portion of the image) is stretched (distorted). In order to prevent such distortion and to accurately perform rendering based on perspective, the image processing apparatus 1 needs to recognize a viewpoint and the accurate position of an object in a 3D space, to accurately set the positional relationship, and to use the setting for drawing. For example, the depth perception of a 3D image changes depending on the distance between a viewpoint and an object by, for example, emphasizing depth perception of a 3D image of an object that is closer to the viewpoint much more than depth perception of a 3D image of an object that is farther away from the viewpoint. If such setting is not properly performed, an object is distorted in the 3D image.

SUMMARY OF THE INVENTION

However, when the image processing apparatus 1 accurately sets the positional relationship between a viewpoint and an object and generates a 3D image, in the generated 3D image, the angles of the buildings 44-1 to 44-6 with respect to the driver 41 (viewpoint) are equal to each other irrespective of the distance to the driver 41 (viewpoint).

In other words, for example, as shown in FIG. 4B, a 3D image is rendered such that a face 44-1-A of the building 44-1 that faces the road 43 (the side 43A), a face 44-2-A of the building 44-2 that faces the road 43 (the side 43A), a face 44-3-A of the building 44-3 that faces the road 43 (the side 43A), a face 44-4-A of the building 44-4 that faces the road 43 (the side 43B), a face 44-5-A of the building 44-5 that faces the road 43 (the side 43B), and a face 44-6-A of the building 44-6 that faces the road 43 (the side 43B) have the same angle with respect to the driver 41, that is, with respect to the bottom of FIG. 4B, although the direction of the faces 44-1 to 44-3 and the direction of the faces 44-4 to 44-6 are opposite to each other.

In FIG. 4B, a projection from the bottom of FIG. 4B is shown as a 3D image that represents the field of view seen by the driver 41 (viewpoint). In this 3D image, the faces 44-1-A to 44-6-A of the buildings 44-1 to 44-6 are rendered in areas 44-1-B to 44-6-B, respectively. In other words, in this 3D image, since all the faces 44-1-A to 44-6-A form large angles close to 90 degrees with respect to the bottom of FIG. 4B, a projection area changes relatively little depending on the distance. Thus, in the 3D image, the faces 44-1-A to 44-6-A are represented to be difficult to see (that is, the rendering area is small) even if the distance to the viewpoint is smaller.

In contrast, for the actual field of view, since the driver 41 is able to move the sight line to a closer building (that is, the driver 41 is able to face the direction of the building), the driver 41 is able to acquire much more information about an object located at a short distance compared with a case shown in FIG. 4B. For example, the face 44-1-A or 44-4-A (the position of the building 44-1 or 44-4) is hardly seen from the driver 41 in a distant position. However, when the driver 41 approaches a closer position (for example, the position of the building 44-3 or 44-6), the driver 41 is able to observe the face 44-1-A or 44-4-A more in detail by moving the sight line in the direction of the position. In other words, by moving the direction of the sight line, the driver 41 is able to change the degree of observation of an object in accordance with the distance from the viewpoint.

By moving the viewpoint according to need as described above, the driver 41 is able to acquire much more information from an object located at a short distance.

Normally, in the real world, for the driver 41 serving as a viewpoint, information of a position located at a short distance is more important. Thus, the importance of information decreases in accordance with an increase in the distance from a viewpoint.

However, since the 3D image 31 is rendered so as not to generate distortion as described above, it is difficult for the image processing apparatus 1 to perform representation in accordance with importance. In other words, it is difficult for the image processing apparatus 1 to generate a 3D image for which a viewing angle is controlled in accordance with the distance from the position of a viewpoint.

For example, as shown in FIG. 4B, since the direction of the sight line of the driver 41 is fixed, when the 3D image 31 is displayed on a screen of a normal monitor that is narrower than the field of view of a human being, the driver 41 may acquire less information about an object located at a short distance compared with the actual field of view.

In addition, since, unlike the actual field of view, the driver 41 serving as a user does not expand the field of view (that is, does not move the sight line) to an object located at a short distance in the 3D image 31, the driver 41 may feel that the field of view represented in the 3D image 31 is narrow.

In addition, as described above, when the 3D image 31 is used for a guide image for a car navigation system, for a similar reason, the driver 41 serving as a user may feel that the range of the field of view actually seen is different from the range of the field of view in the 3D image 31. Thus, the driver 41 may not intuitively associate the 3D image 31 and a real view and may not easily understand the details of the guide image.

In addition, in order to compensate for such narrowness of the field of view, a method for compressing an image of a wide-angle field of view into a normal field of view by adopting the advantages of using a wide-angle lens is suggested. Although all the information with a wide viewing angle is represented in the wide-angle image generated using such a method, distortion occurs in the image. Thus, the wide-angle image may prevent the driver 41 serving as a user from easily understanding the details of the image. When the wide-angle image is used as a guide image (small screen), this becomes a bigger problem. The driver 41 may not intuitively associate the wide-angle image and a real view. Thus, the driver 41 may not easily understand the details of the guide image.

As described above, since 3D objects have been rendered with a constant viewing angle based on perspective irrespective of depth, it is difficult to change the shape of an object in accordance with the distance from a viewpoint. In addition, if the shape of an object is changed as in a wide-angle image, the image is distorted, and the visibility is reduced.

It is desirable to provide a 3D image easily seen by a user, for example, by changing the shape of an object without reducing the visibility of the image, by generating bias in the amount of represented information in accordance with the positional relationship of the object, and by generating the 3D image for which a viewing angle is controlled in accordance with the distance from the position of a viewpoint.

An information processing apparatus according to an embodiment of the present invention includes depth determination means for determining a depth of a vertex of a polygon from a viewpoint in a three-dimensional space, the polygon forming a surface of a solid object from which a three-dimensional image is generated, and vertex moving means for moving the position of the vertex by the amount of movement determined in accordance with the depth determined by the depth determination means.

The information processing apparatus may further include polygon rendering means for rendering a three-dimensional image obtained by projecting a polygon formed by the vertex moved by the vertex moving means onto the plane.

The information processing apparatus may further include sight-line-vector positional relationship detection means for detecting a relative position of the vertex with respect to a sight-line-vector representing a direction of a field of view in the three-dimensional space. The depth determination means may determine the depth of the vertex in accordance with the relative position of the vertex with respect to the sight-line-vector detected by the sight-line-vector positional relationship detection means.

The sight-line-vector positional relationship detection means may detect, as the relative position, a distance from the vertex to the sight-line-vector and a distance from the vertex to a horizontal vector that is perpendicular to the sight-line-vector.

The depth determination means may determine the depth of the vertex using a predetermined threshold value set in advance.

When the depth determination means determines that the vertex is located at a position farther than a point serving as the threshold value, the vertex moving means may not move the vertex. When the depth determination means determines that the vertex is located at a position closer than the point serving as the threshold value, the vertex moving means may move the vertex by a distance based on the depth.

The information processing apparatus may further include polygon detection means for detecting the polygon forming the surface of the solid object from which the three-dimensional image is generated and vertex detection means for detecting the vertex of the polygon detected by the polygon detection means. The depth determination means may determine the depth of the vertex detected by the vertex detection means.

The vertex moving means may determine the amounts of movement of the vertex in a vertical direction and in a horizontal direction independently of each other. The vertex moving means may move the vertex in the vertical direction and in the horizontal direction by the determined amounts of movement, respectively.

An information processing method according to an embodiment of the present invention includes the steps of determining a depth of a vertex of a polygon from a viewpoint in a three-dimensional space, the polygon forming a surface of a solid object from which a three-dimensional image is generated, and moving the position of the vertex by the amount of movement determined in accordance with the depth determined by the depth determining step.

A program according to an embodiment of the present invention includes the steps of determining a depth of a vertex of a polygon from a viewpoint in a three-dimensional space, the polygon forming a surface of a solid object from which a three-dimensional image is generated, and moving the position of the vertex by the amount of movement determined in accordance with the depth determined by the depth determining step.

A navigation apparatus according to an embodiment of the present invention includes depth determination means for determining a depth of a vertex of a polygon from a viewpoint in a three-dimensional space, the polygon forming a surface of a solid object from which a three-dimensional image is generated, and vertex moving means for moving the position of the vertex by the amount of movement determined in accordance with the depth determined by the depth determination means.

According to the foregoing information processing apparatus and method, program, and navigation apparatus, the depth of a vertex of a polygon from a viewpoint in a 3D space, the polygon forming a surface of a solid object from which a 3D image is generated, is determined, the amount of movement of the position of the vertex is determined in accordance with the determined depth, and the vertex is moved by the determined amount of movement.

Accordingly, for example, a 3D image that is more easily seen by a user can be provided by controlling a viewing angle in accordance with a distance from a viewpoint.

BRIEF DESCRIPTION OF THE DRAWINGS

FIG. 3 shows an example of a known 3D image;

FIG. 5 is a block diagram showing an example of the structure of an image processing apparatus according to an embodiment of the present invention;

FIG. 6 is an illustration for explaining an example of a 3D space;

DESCRIPTION OF THE PREFERRED EMBODIMENTS

Figure 1:
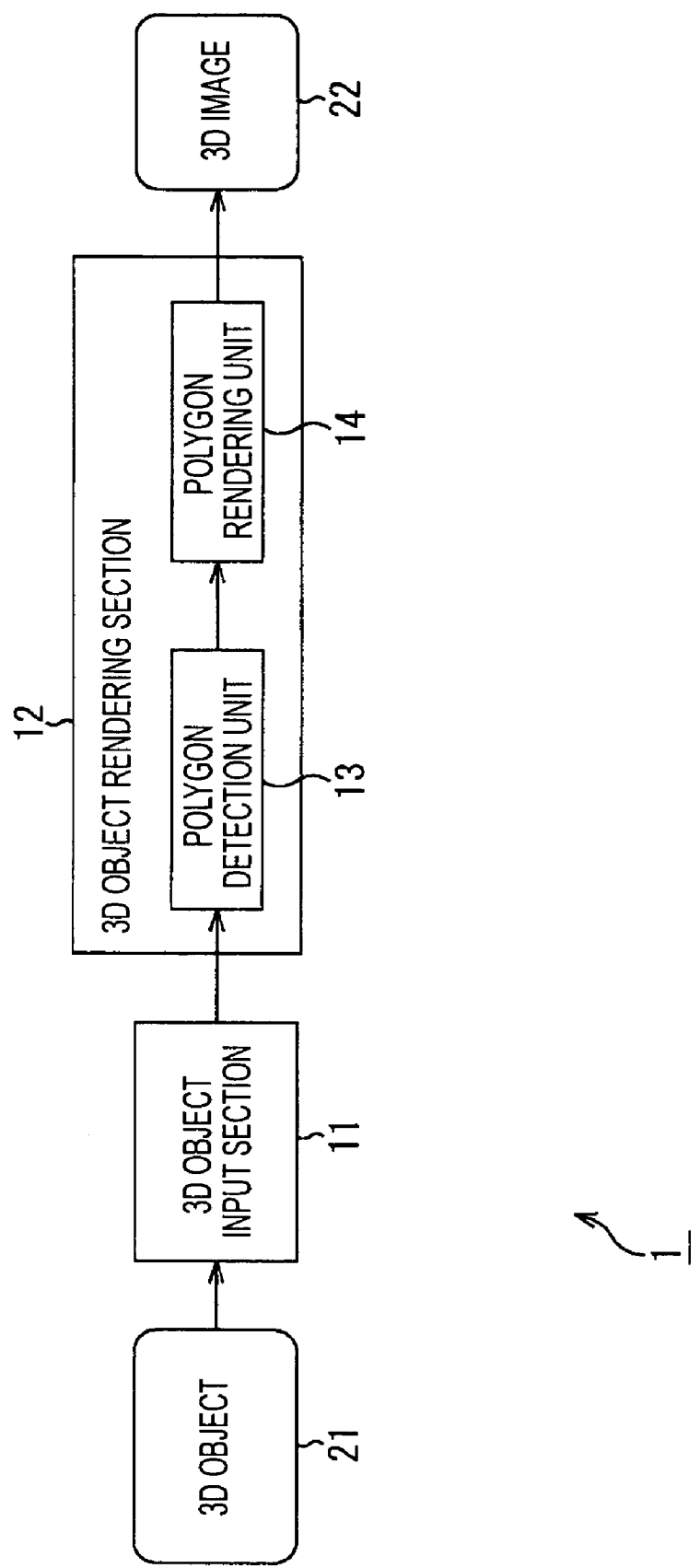
FIG. 1 shows an example of the structure of a known image processing apparatus.
Figure 2:
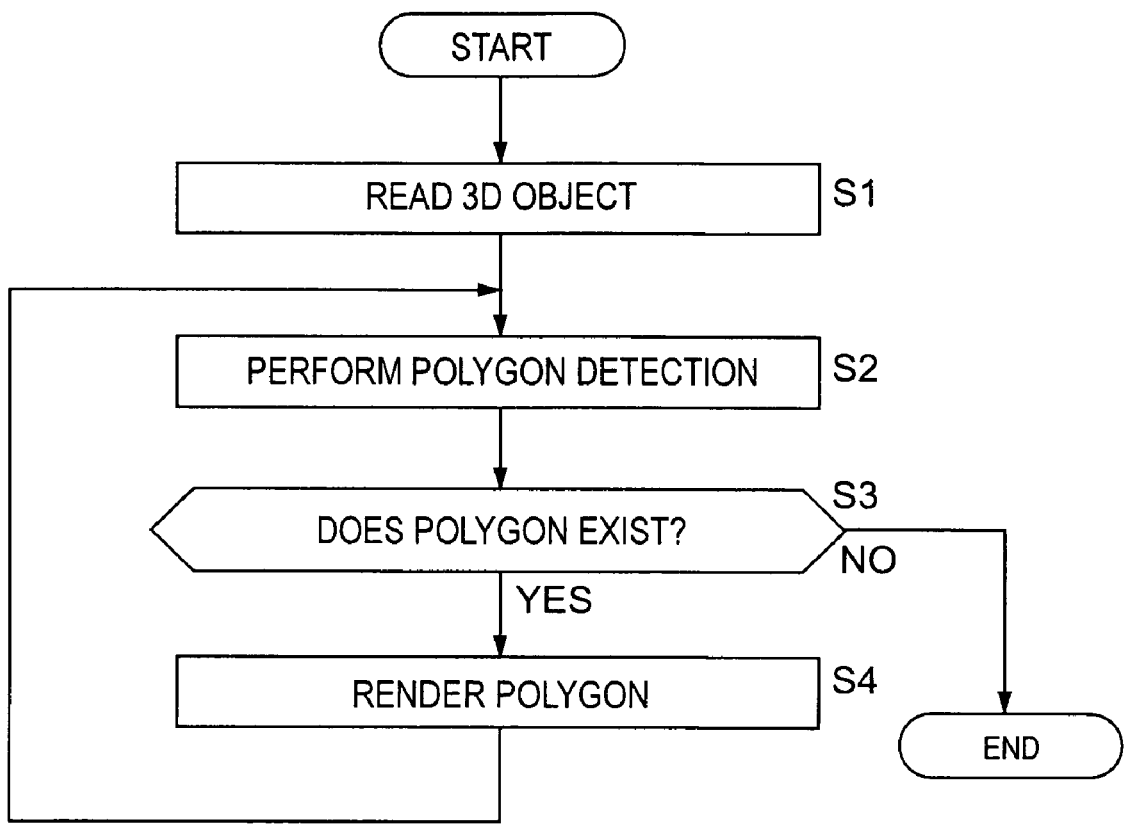
FIG. 2 is a flowchart of a known 3D image process.
Figure 4A:
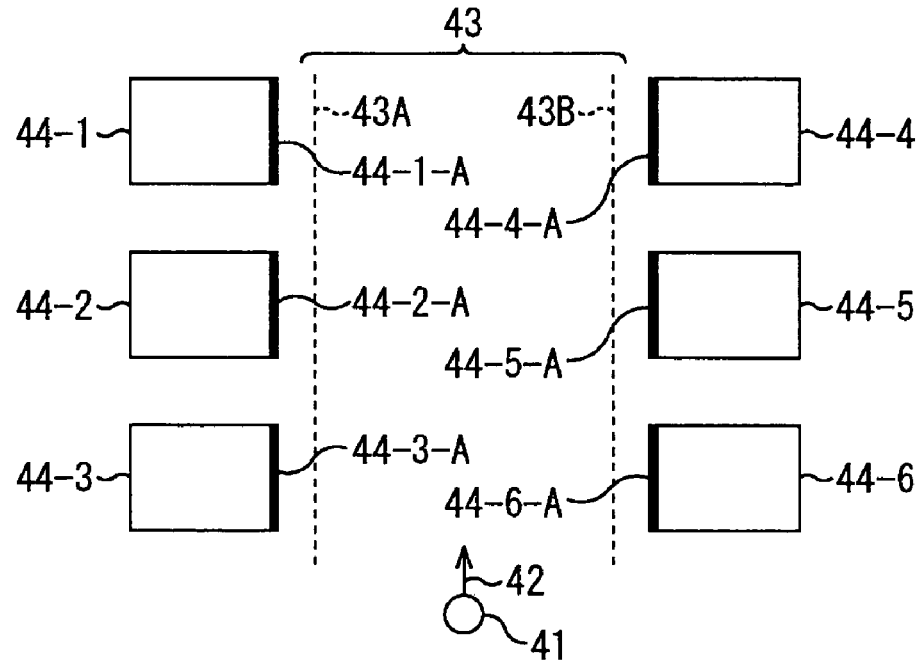
FIGS. 4A and 4B show an example of a characteristic of the known 3D image.
Figure 4B:
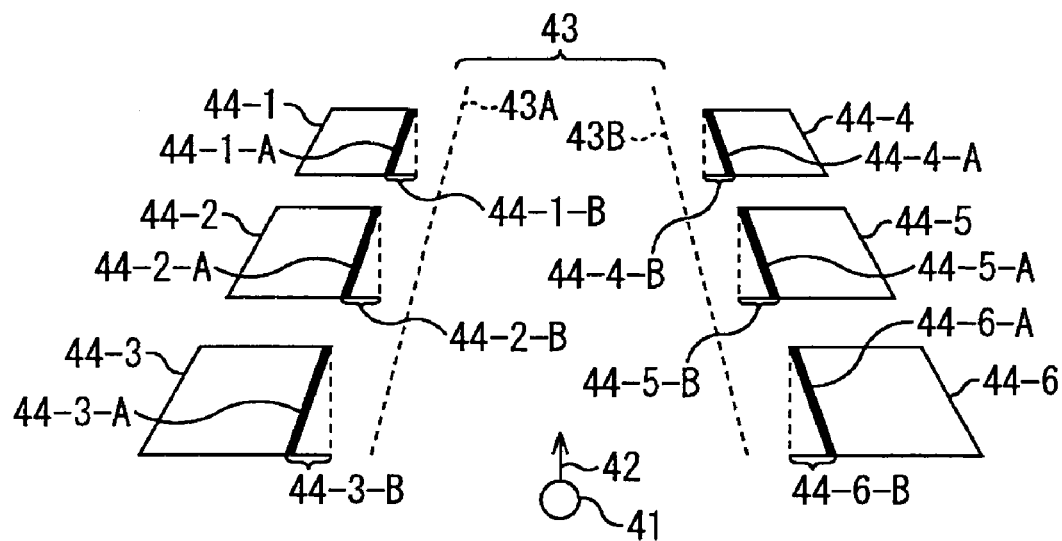

Before describing embodiments of the present invention, the correspondence between the features of the claims and the specific elements disclosed in the embodiments of the present invention will be discussed below. This description is provided to confirm that embodiments supporting the claimed invention are described in this specification. Thus, even if an element in the embodiments is not described here as relating to a certain feature of the present invention, this does not mean that the element does not relate to that feature of the claims. In contrast, even if an element is described here as relating to a certain feature of the claims, this does not mean that the element does not relate to other features of the claims.

Furthermore, this description should not be construed as restricting the invention to the aspects of the invention disclosed in the embodiments described in the claims. In other words, this description does not preclude the existence of aspects of the present invention that are described in the embodiments but that are not claimed in the invention of this application: in other words, it does not preclude the existence of aspects of the present invention that may be claimed by a divisional application or added by amendment in the future.

According to an embodiment of the present invention, an information processing apparatus (for example, an image processing apparatus 101 in FIG. 5) for generating a three-dimensional image (for example, a 3D image 132 in FIG. 5) obtained by projecting a three-dimensional space onto a plane is provided. The information processing apparatus includes depth determination means (for example, a vertex depth determination unit 124 in FIG. 5) for determining a depth of a vertex of a polygon from a viewpoint (for example, a viewpoint 151 in FIG. 6) in the three-dimensional space, the polygon forming a surface of a solid object (for example, a 3D object 131 in FIG. 5) from which the three-dimensional image is generated, and vertex moving means (for example, a vertex moving unit 125 in FIG. 5) for moving the position of the vertex by the amount of movement determined in accordance with the depth determined by the depth determination means.

The information processing apparatus may further include polygon rendering means (for example, a polygon rendering unit 126 in FIG. 5) for rendering a three-dimensional image obtained by projecting a polygon formed by the vertex moved by the vertex moving means onto the plane.

The information processing apparatus may further include sight-line-vector positional relationship detection means (for example, a sight-line-vector positional relationship detection unit 123 in FIG. 5) for detecting a relative position of the vertex with respect to a sight-line-vector (for example, a sight-line-vector 161 in FIG. 6) representing a direction of a field of view in the three-dimensional space. The depth determination means may determine the depth of the vertex in accordance with the relative position of the vertex with respect to the sight-line-vector detected by the sight line vector positional relationship detection means.

The sight-line-vector positional relationship detection means may detect, as the relative position, a distance (for example, a distance U in FIG. 7) from the vertex to the sight-line-vector and a distance (for example, a distance W in FIG. 7) from the vertex to a horizontal vector that is perpendicular to the sight-line-vector.

The depth determination means may determine the depth of the vertex using a predetermined threshold value (for example, a target point 152 in FIG. 6) set in advance.

When the depth determination means determines that the vertex (for example, a vertex 174 or 175 in FIG. 8) is located at a position farther than a point serving as the threshold value, the vertex moving means may not move the vertex. When the depth determination means determines that the vertex (for example, for a vertex 171, 172, or 173 in FIG. 8) is located at a position closer than the point serving as the threshold value, the vertex moving means may move the vertex by a distance based on the depth (for example, step S38 in FIG. 9).

The information processing apparatus may further include polygon detection means (for example, a polygon detection unit 121 in FIG. 5) for detecting the polygon forming the surface of the solid object from which the three-dimensional image is generated and vertex detection means (for example, a vertex detection unit 122 in FIG. 5) for detecting the vertex of the polygon detected by the polygon detection means. The depth determination means may determine the depth of the vertex detected by the vertex detection means.

The vertex moving means may determine the amounts of movement of the vertex in a vertical direction (for example, a direction of a vector 163 in FIG. 6) and in a horizontal direction (for example, a direction of a vector 162 in FIG. 6) independently of each other. The vertex moving means may move the vertex in the vertical direction and in the horizontal direction by the determined amounts of movement, respectively.

According to an embodiment of the present invention, an information processing method for an information processing apparatus (for example, the image processing apparatus 101 in FIG. 5) for generating a three-dimensional image (for example, the 3D image 132 in FIG. 5) obtained by projecting a three-dimensional space onto a plane is provided. The information processing method includes the steps of determining (for example, step S37 in FIG. 9) a depth of a vertex of a polygon from a viewpoint (for example, the viewpoint 151 in FIG. 6) in the three-dimensional space, the polygon forming a surface of a solid object (for example, the 3D object 131 in FIG. 5) from which the three-dimensional image is generated, and moving (for example, step S38 in FIG. 9) the position of the vertex by the amount of movement determined in accordance with the depth determined by the depth determining step.

According to an embodiment of the present invention, a program for causing a computer (for example, the image processing apparatus 101 in FIG. 5) to perform processing for generating a three-dimensional image (for example, the 3D image 132 in FIG. 5) obtained by projecting a three-dimensional space onto a plane is provided. The program includes the steps of determining (for example, step S37 in FIG. 9) a depth of a vertex of a polygon from a viewpoint (for example, the viewpoint 151 in FIG. 6) in the three-dimensional space, the polygon forming a surface of a solid object (for example, the 3D object 131 in FIG. 5) from which the three-dimensional image is generated, and moving (for example, step S38 in FIG. 9) the position of the vertex by the amount of movement determined in accordance with the depth determined by the depth determining step.

According to an embodiment of the present invention, a navigation apparatus (for example, a car navigation system 300 in FIG. 12) for generating a three-dimensional image (for example, an output image 315 in FIG. 12) obtained by projecting a three-dimensional space onto a plane is provided. The navigation apparatus includes depth determination means (for example, the vertex depth determination unit 124 in FIG. 5) for determining a depth of a vertex of a polygon from a viewpoint (for example, field of view information 313 in FIG. 12) in the three-dimensional space, the polygon forming a surface of a solid object (for example, 3D map information 314 in FIG. 12) from which the three-dimensional image is generated, and vertex moving means (for example, the vertex moving unit 125 in FIG. 5) for moving the position of the vertex by the amount of movement determined in accordance with the depth determined by the depth determination means.

Embodiments of the present invention will be described with reference to the drawings.

FIG. 5 shows an example of the structure of an image processing apparatus according to an embodiment of the present invention.

Referring to FIG. 5, for example, in accordance with information on a solid object in a 3D space, an image processing apparatus 101 generates a 3D image obtained by projecting the object onto a plane. The image processing apparatus 101 includes a 3D object input section 111 and a 3D object rendering section 112. In FIG. 5, rectangles represent processors forming the image processing apparatus 101, and rounded-corner rectangles represent data input to or output from the processors.

The image processing apparatus 101 receives a 3D object 131, which is data representing a solid object in a 3D space, as an input and generates a 3D image 132 based on the 3D object 131.

The 3D object input section 111 reads data (the 3D object 131) in which the structure of a solid object is described and converts the description contents into a scene graph including a 3D object hierarchy. The 3D object input section 111 supplies the scene graph to the 3D object rendering section 112.

The 3D object rendering section 112 generates the 3D image 132 in accordance with the scene graph. The 3D object rendering section 112 includes a polygon detection unit 121, a vertex detection unit 122, a sight-line-vector positional relationship detection unit 123, a vertex depth determination unit 124, a vertex moving unit 125, and a polygon rendering unit 126.

The polygon detection unit 121 detects a polygon from the received scene graph and supplies information of the polygon to the vertex detection unit 122. The vertex detection unit 122 detects vertices of the polygon detected by the polygon detection unit 121 and supplies information of the vertices to the sight-line-vector positional relationship detection unit 123. The sight-line-vector positional relationship detection unit 123 detects the positional relationship between each of the vertices and a sight-line-vector by calculating the relative position of each of the vertices detected by the vertex detection unit 122 in accordance with the sight-line-vector representing the direction of a target point from a viewpoint in a 3D space.

FIG. 6 is a schematic diagram for explaining a sight-line vector. As shown in FIG. 6, in a 3D space 141 to be projected onto a plane, a viewpoint 151 and a target point 152 are set in order to determine the position and direction (range) for projection of the 3D space 141. The viewpoint 151 represents the position of a user, and the target point 152 represents the position of the center of the field of view of the user and the depth (the degree of three dimensionality) of a projected image. In other words, a 3D image represents the field of view when the user looks in the direction of the target point 152 from the viewpoint 151, and the distance to the target point 152 represents the depth of the field of view. For example, in order to generate a 3D image representing the field of view when the user looks at a short distance, the distance between the viewpoint 151 and the target point 152 is set to be short. In contrast, in order to generate a 3D image representing the field of view when the user looks at a long distance, the distance between the viewpoint 151 and the target point 152 is set to be long.

As shown in FIG. 6, a sight-line-vector 161 starts from the viewpoint 151 to the target point 152, and vectors 162 and 163 start from the viewpoint 151 and are orthogonal to each other on a plane that is perpendicular to the sight-line-vector 161. In other words, the sight-line-vector 161 represents the direction of the target point 152 from the viewpoint 151, and each of the vectors 162 and 163 represents a vertical direction of the sight-line-vector 161.

Figure 7:
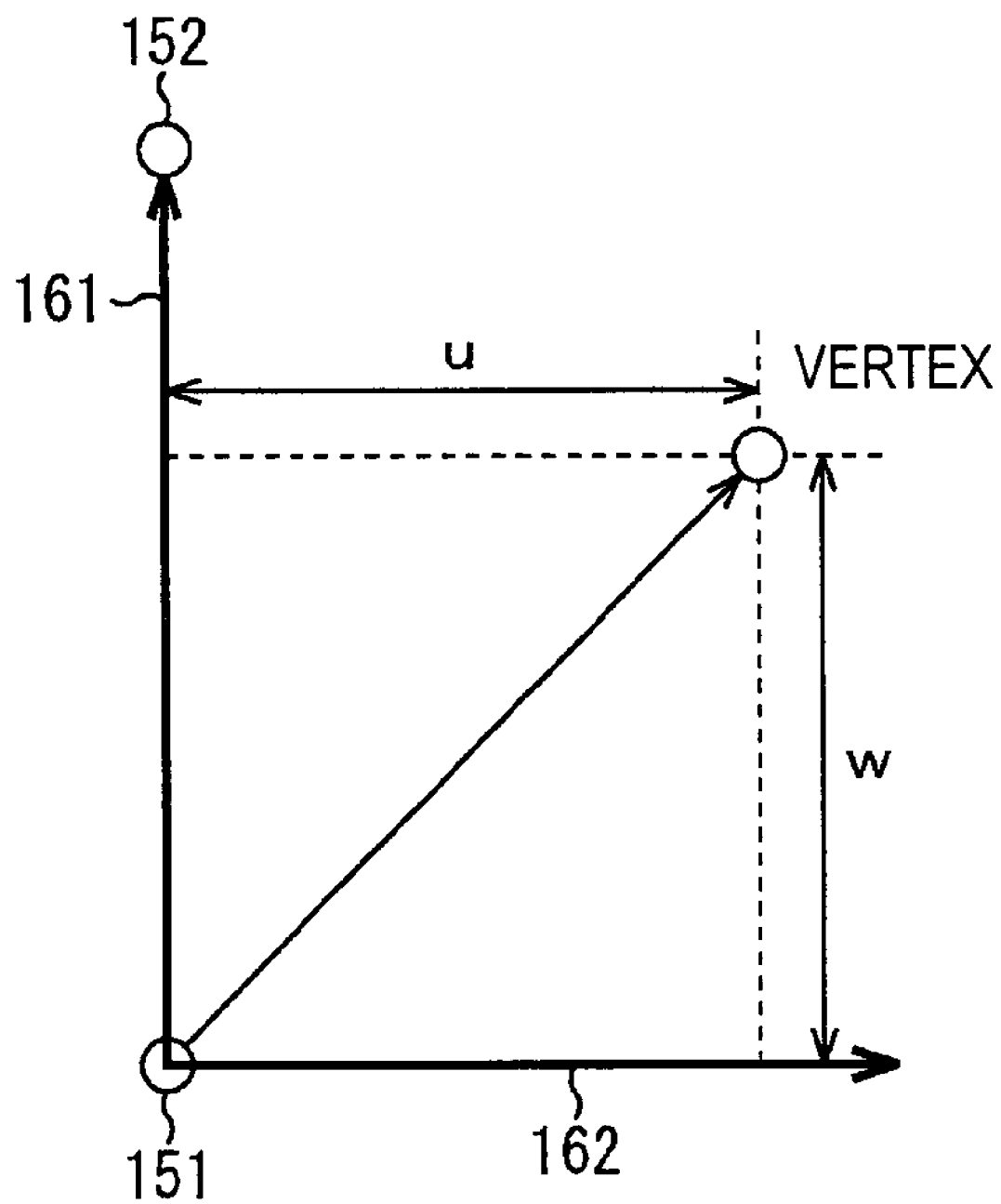
FIG. 7 is an illustration for explaining information representing the relationship between a sight line vector and a vertex.

The sight-line-vector positional relationship detection unit 123 shown in FIG. 5 detects the position of each vertex with respect to the sight-line-vector 161. In other words, as shown in FIG. 7, the sight-line-vector positional relationship detection unit 123 calculates a distance U from each vertex forming a polygon to the sight-line-vector 161 and a distance W from each vertex forming the polygon to the horizontal vector 162 that is perpendicular to the sight-line-vector 161. Referring back to FIG. 5, the sight-line-vector positional relationship detection unit 123 supplies such information about the detected vertices to the vertex depth determination unit 124.

The vertex depth determination unit 124 determines the depth of each vertex from the viewpoint 151 in accordance with the information supplied from the sight-line-vector positional relationship detection unit 123. For example, the vertex depth determination unit 124 determines whether or not each vertex is located at a position deeper than the target point 152 (a position farther than the target point 152) and supplies the determination result and the information about each vertex to the vertex moving unit 125. Here, any value can be set as a reference depth, which functions as a threshold value. The reference depth is not necessarily the depth of the target point 152. For example, a distance half the depth of the target point 152 or a distance twice the depth of the target point 152 may be used as a reference depth.

Figure 8:
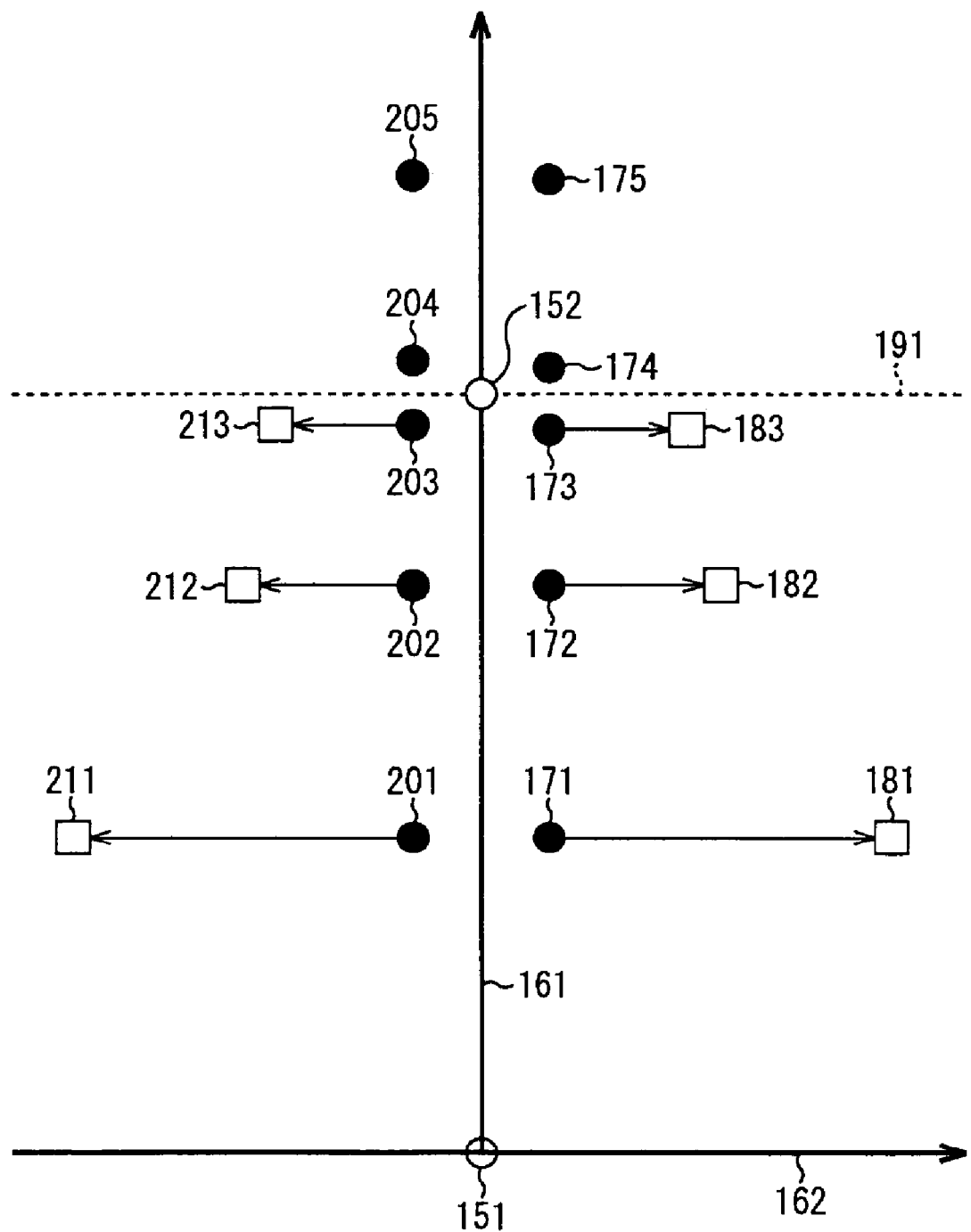
FIG. 8 is a schematic diagram for explaining the movement of vertices.

The vertex moving unit 125 adjusts the coordinates of a vertex and moves the position of the vertex in accordance with the determination result of the vertex depth determination unit 124. FIG. 8 shows a case where the vertex moving unit 125 moves the positions of vertices.

Referring to FIG. 8, vertices 171 to 173 are located closer than the target point 152 when viewed from the viewpoint 151 (located at positions lower than a dotted line 191 in FIG. 8). Thus, the vertex moving unit 125 moves the vertices 171 to 173 in the direction of the horizontal vector 162 that is perpendicular to the sight line vector 161 by the amount of movement based on the corresponding depth (the corresponding distance to the target point 152 in the direction of the sight line vector 161). For example, the vertex moving unit 125 determines the amount of movement so as to be proportional to the square of a value obtained by subtracting the distance W between a vertex and the vector 162 that is perpendicular to the sight line vector 161 from the distance between the viewpoint 151 and the target point 152. In FIG. 8, squares 181 to 183 represent moved positions of the vertices 171 to 173 represented by black circles.

In addition, in FIG. 8, vertices 174 and 175 are located deeper than the target point 152 when viewed from the viewpoint 151 (located at positions upper than the dotted line 191 in FIG. 8). Thus, the vertex moving unit 125 does not move the vertices 174 and 175.

Furthermore, referring to FIG. 8, similarly to the vertices 171 to 173, vertices 201 to 203 are located closer than the target point 152 when viewed from the viewpoint 151 (located at positions lower than the dotted line 191 in FIG. 8). However, the vertices 201 to 203 face the vertices 171 to 173 with the sight-line-vector 161 there between (the vertices 201 to 203 are located on the left side of the sight line vector 161). Thus, the vertex moving unit 125 moves the vertices 201 to 203 in a direction opposite to the horizontal vector 162 that is perpendicular to the sight-line-vector 161 by the amount of movement based on the corresponding depth (the corresponding distance to the target point 152 in the direction of the sight line vector 161). In FIG. 8, squares 211 to 213 represent moved positions of the vertices 201 to 203 represented by black circles.

Here, any procedure can be adopted for determining a vertex-moving distance as long as it is based on a depth from the viewpoint 151. For example, a movement distance may increase in accordance with an increase in the depth from the viewpoint 151. In addition, for example, a vertex deeper than the target point 152 also may be moved.

After moving the vertices as described above, the vertex moving unit 125 supplies information about the moved vertices to the polygon rendering unit 126. The polygon rendering unit 126 projects the supplied vertices (moved vertices) of the polygon onto a 2D projection face and renders the 3D image 132. The polygon rendering unit 126 outputs the 3D image 132 to the outside of the image processing apparatus 101.

Although only a case where a vertex is moved in the horizontal direction (the direction of the vector 162 or the opposite direction) has been described, the image processing apparatus 101 also moves the vertex (adjusts coordinates) in the vertical direction (the direction of the vector 163 or the opposite direction), similarly to the movement in the horizontal direction. However, since movement of a vertex in the horizontal direction and movement of the vertex in the vertical direction are independent of each other, the image processing apparatus 101 is capable of setting a procedure for determining a vertex-moving amount in the horizontal direction and a procedure for determining a vertex-moving amount in the vertical direction independently. In other words, for example, the image processing apparatus 101 may set a vertex-moving amount in the horizontal direction so as to be proportional to the square of a depth and may set a vertex-moving amount in the vertical direction so as to be directly proportional to the depth. Accordingly, the image processing apparatus 101 is capable of setting the amount of movement in the vertical direction and the amount of movement in the horizontal direction for a vertex. Obviously, the image processing apparatus 101 may move a vertex only in the vertical direction or the horizontal direction.

Movement (adjustment) is not necessarily performed in the vertical direction and/or the horizontal direction. For example, the movement (adjustment) may be performed in an oblique direction, a rotation direction, or a depth direction with respect to a sight-line-vector. In addition, the movement (adjustment) may be performed in a combined direction.

Accordingly, the image processing apparatus 101 is capable of properly adjusting the positions of vertices of a solid object in a projected image so as not to generate unnecessary distortion that prevents a user from easily seeing a 3D image, thus generating an image that is more easily seen by the user.

Figure 9:
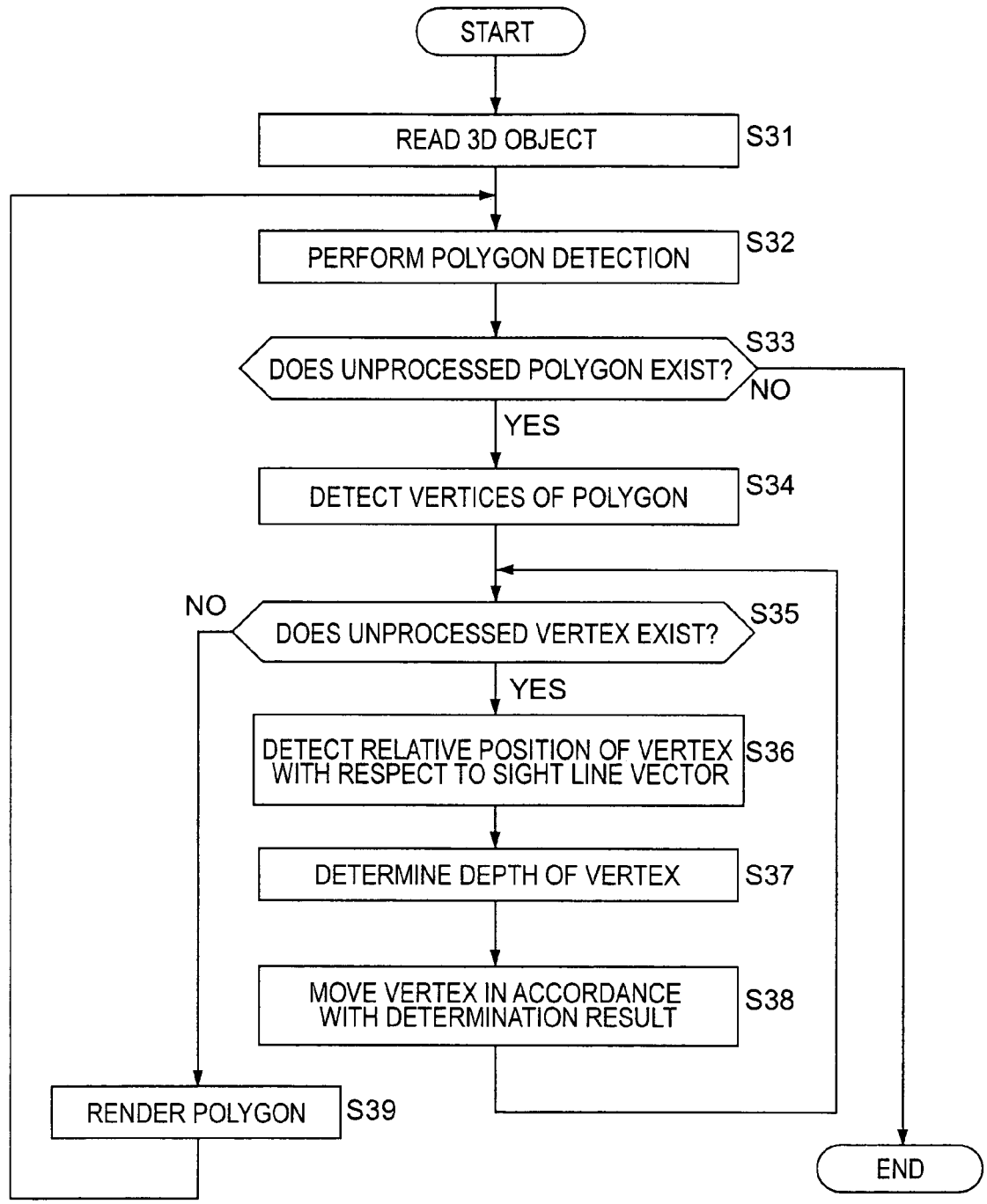
FIG. 9 is a flowchart of a 3D image process.

A specific 3D image process performed by the image processing apparatus 101 is described next with reference to a flowchart shown in FIG. 9.

In step S31, the 3D object input section 111 reads the 3D object 131 supplied from the outside of the image processing apparatus 101 and converts the details described in the file into a scene graph including a 3D object hierarchy. The 3D object input section 111 supplies the scene graph to the polygon detection unit 121 of the 3D object rendering section 112. In step S32, the polygon detection unit 121 performs polygon detection for detecting a polygon from the scene graph and supplies the detection result to the vertex detection unit 122.

In step S33, the vertex detection unit 122 determines whether or not an unprocessed polygon exists in accordance with the detection result of the polygon detection unit 121. If it is determined that an unprocessed polygon on which processing relating to a vertex, which will be described below, is not performed exists, the process proceeds to step S34. In step S34, the vertex detection unit 122 detects vertices of the polygon and supplies the vertices to the sight-line-vector positional relationship detection unit 123.

In step S35, the sight-line vector positional relationship detection unit 123 determines whether or not an unprocessed vertex exists among the vertices detected by the vertex detection unit 122. If it is determined that an unprocessed vertex on which processing relating to vertex movement, which will be described below, is not performed exists, the process proceeds to step S36. In step S36, the sight-line-vector positional relationship detection unit 123 detects the relative position (the distances U and W in FIG. 7) of the vertex with respect to the sight-line-vector 161, and supplies information about the relative position to the vertex depth determination unit 124.

In step S37, the vertex depth determination unit 124 performs a determination relating to the depth of the vertex, such as a determination of whether or not the depth of the vertex is greater than the target point 152, in accordance with the information supplied from the sight-line-vector positional relationship detection unit 123, and supplies the determination result and information about the vertex, such as coordinates, to the vertex moving unit 125. In step S38, the vertex moving unit 125 adjusts the coordinates of the vertex in accordance with the supplied determination result and moves the vertex. After moving the vertex, the vertex moving unit 125 supplies information about the moved vertex to the polygon rendering unit 126. Then, the process returns to step S35, and the subsequent processing is repeated. In other words, each unit of the 3D object rendering section 112 repeats the processing from steps S35 to S38 and performs moving processing for all the vertices detected by the vertex detection unit 122.

Then, if it is determined in step S35 that no unprocessed vertex exists, the process proceeds to step S39. In step S39, the polygon rendering unit 126 renders a polygon formed by the moved vertices in accordance with the information supplied from the vertex moving unit 125. After the polygon is rendered, the process returns to step S32 to repeat the subsequent processing for another polygon. In other words, each unit of the 3D object rendering section 112 repeats the processing from steps S32 to S39 until all the solid polygons in a 3D space are detected and processed.

Then, if it is determined in step S33 that no unprocessed polygon exists, the vertex detection unit 122 causes the polygon rendering unit 126 to output the rendered 3D image and terminates the 3D image process.

By the 3D image process performed as described above, the image processing apparatus 101 is capable of properly adjusting the positions of vertices of a solid object in a projected image, thus generating a 3D image that is more easily seen by the user.

Figure 10A:
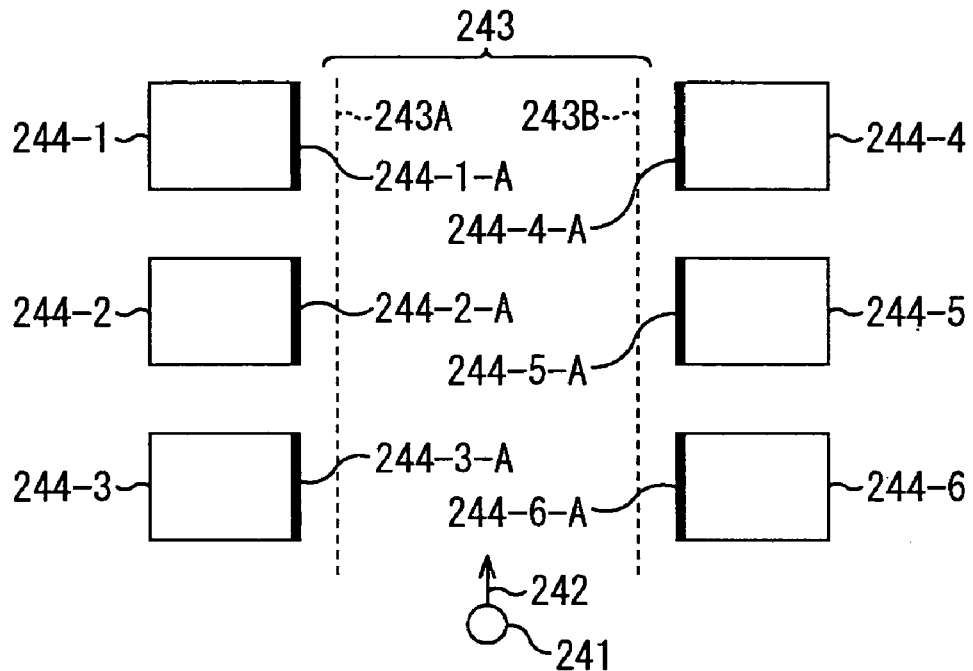
FIGS. 10A and 10B show an example of a characteristic of a 3D image.
Figure 10B:
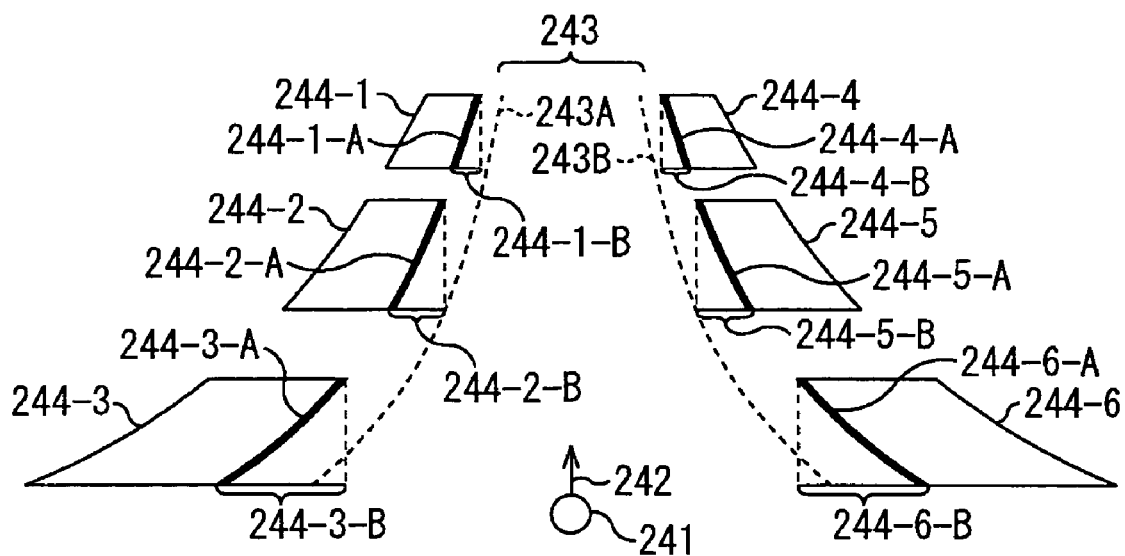

In other words, as shown in FIG. 10A, when a user (vehicle) 241 looks in the direction of an arrow 242 (in the upper direction in FIG. 10A) at a road 243 located between buildings 244-1 to 244-3 and buildings 244-4 to 244-6 that are arranged so as to face each other with sides 243A and 243B therebetween, in a 3D image, as shown in FIG. 10B, the buildings 244-1 and 244-4 that are located farther away from the user 241 are represented smaller and the buildings 244-3 and 244-6 that are located closer to the user 241 are represented larger. In addition, in the 3D image, faces 244-1-A to 244-6-A of the buildings 244-1 to 244-6 near the road 243 are adjusted so as to be open toward the user 241. In other words, as shown in FIG. 10B, rendering areas 244-1-B to 244-6-B of the faces 244-1-A to 244-6-A when the 3D image is projected from the bottom in FIG. 10B change depending on the distance from the user 241 to the corresponding faces.

In other words, since, as described above, the amount of movement of a vertex of a polygon in a 3D space changes depending on the distance from a viewpoint, although the amount of adjustment of the angle between the bottom in FIG. 10B and each of the faces 244-1-A and 244-4-A that are located farther away from the user 241 is relatively small, the amount of adjustment of the angle between the bottom in FIG. 10B and each of the faces 244-3-A and 244-6-A that are located closer to the user 241 is relatively large. Thus, the rendering areas 244-3-B and 244-6-B, the rendering areas 244-2-B and 244-5-B, and the rendering areas 244-1-B and 244-4-B are increased in that order. In other words, in the 3D image, the faces 244-3-A and 244-6-A, the faces 244-2-A and 244-5-A, and the faces 244-1-A and 244-4-A are rendered as images more easily seen in that order (rendered to be more widely open in that order).

Figure 11:
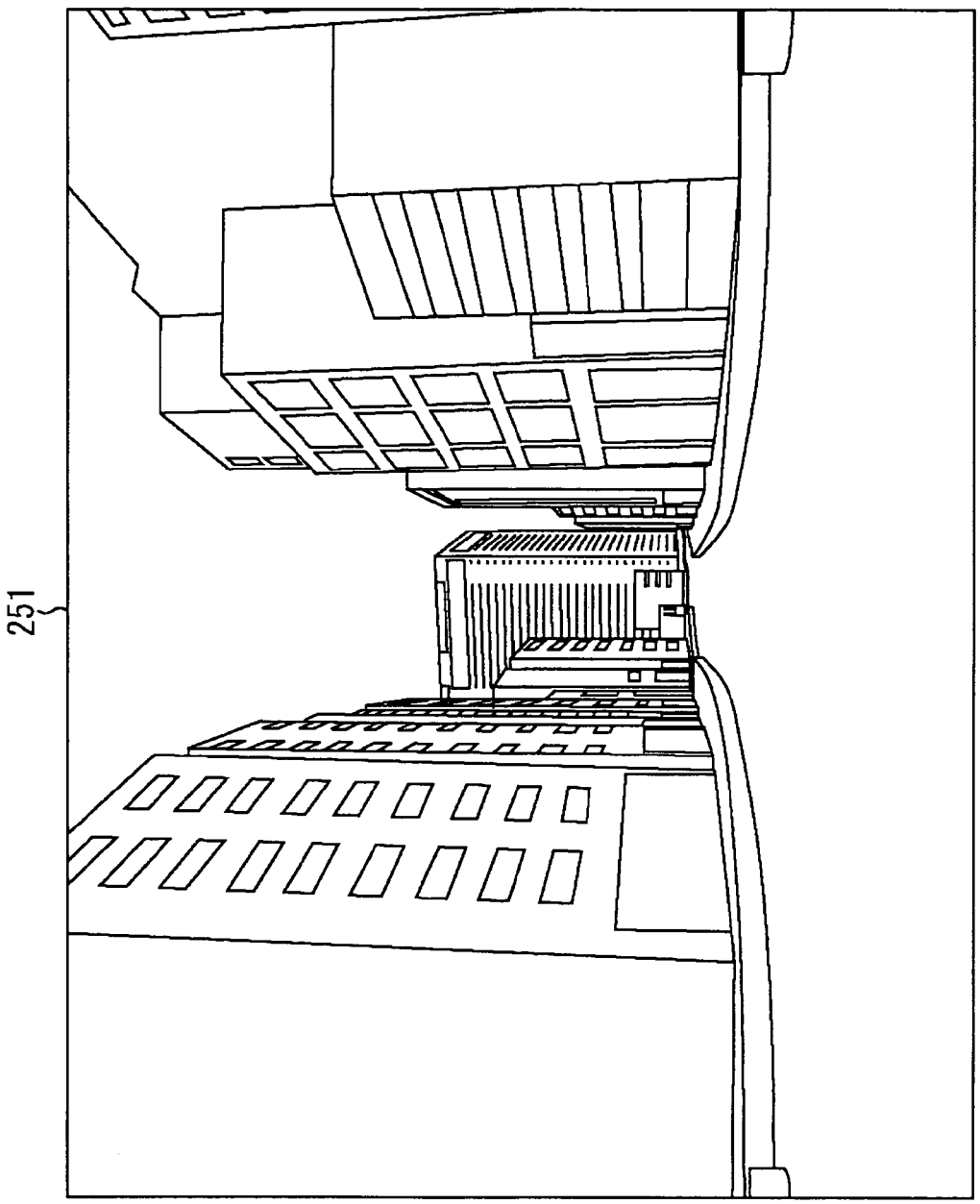
FIG. 11 shows an example of a 3D image.

FIG. 11 shows a specific image. An image 251 in FIG. 11 represents a 3D image with the same field of view as the 3D image 31 in FIG. 3, and it is rendered after vertices of each solid object rendered in the 3D image 31 in FIG. 3 are moved. Thus, as shown in FIG. 11, in the image 251, a closer building and a distant building have different directions from each other. A side face of a building closer to a user that faces another building with a road therebetween is rendered to be more easily seen by the user. In addition, since the image 251 has a characteristic similar to that of the actual field of view of the user in which a wider field of view can be achieved for an object closer to the user, the user is able to intuitively understand the details of the image.

In other words, the foregoing procedure for generating a 3D image may be used in various fields. For example, such a procedure may be used for car navigation systems.

Figure 12:
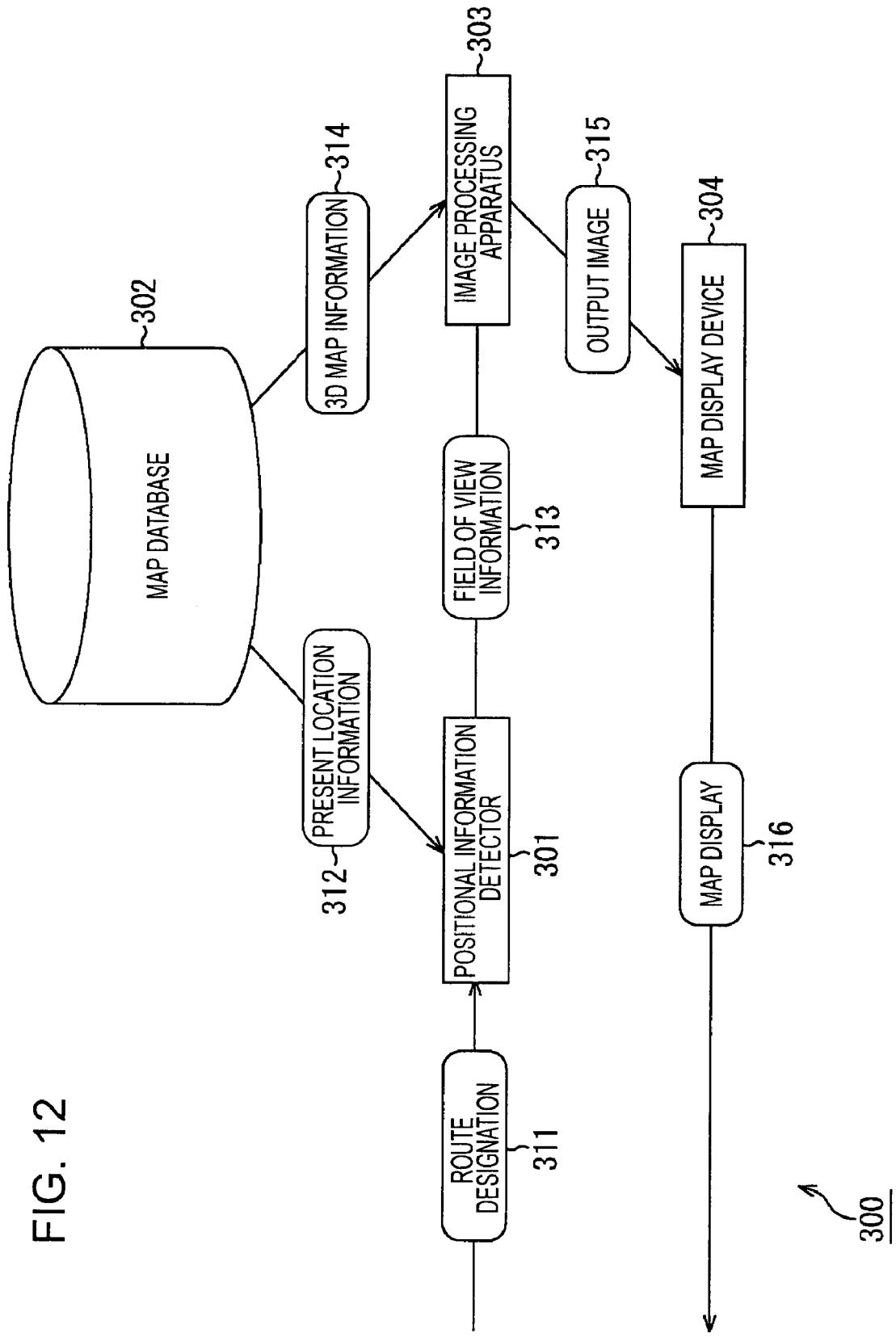
FIG. 12 shows an example of the structure of a car navigation system according to an embodiment of the present invention.

FIG. 12 is a block diagram showing an example of the structure of a car navigation system according to an embodiment of the present invention. Referring to FIG. 12, rectangles represent devices forming a car navigation system 300, and rounded-corner rectangles represent data input to or output from each device.

As shown in FIG. 12, the car navigation system 300 shows a way and notifies the present location to a driver who is driving a vehicle. The car navigation system 300 includes a positional information detector 301, a map database 302, an image processing apparatus 303, and a map display device 304.

For example, the positional information detector 301 receives route designation 311 input by a user or the like and acquires present location information 312 using the map database 302. The positional information detector 301 detects the present location in accordance with such information, generates field of view information 313 from the present location, and supplies the field of view information 313 to the image processing apparatus 303.

The image processing apparatus 303 performs image processing similar to that performed by the image processing apparatus 101. The image processing apparatus 303 is capable of moving vertices of a solid object to be rendered and changing the shape of an image to an optimal shape. After acquiring the field of view information 313 from the positional information detector 301, the image processing apparatus 303 acquires 3D map information 314 from the map database 302. The image processing apparatus 303 generates an output image 315 of a 3D image in accordance with such information and supplies the output image 315 to the map display device 304.

The map display device 304 outputs a map display output 316 for displaying a map in accordance with the output image 315 to the outside of the car navigation system 300.

As described above, the car navigation system 300 is capable of showing a way and displaying the present location using an image in which vertices of a solid object are adjusted. Thus, since showing a way and displaying the present location can be performed in a 3D image that is closer to the actual field of view, a user is able to intuitively (more easily) understand the details of the image.

Figure 13:
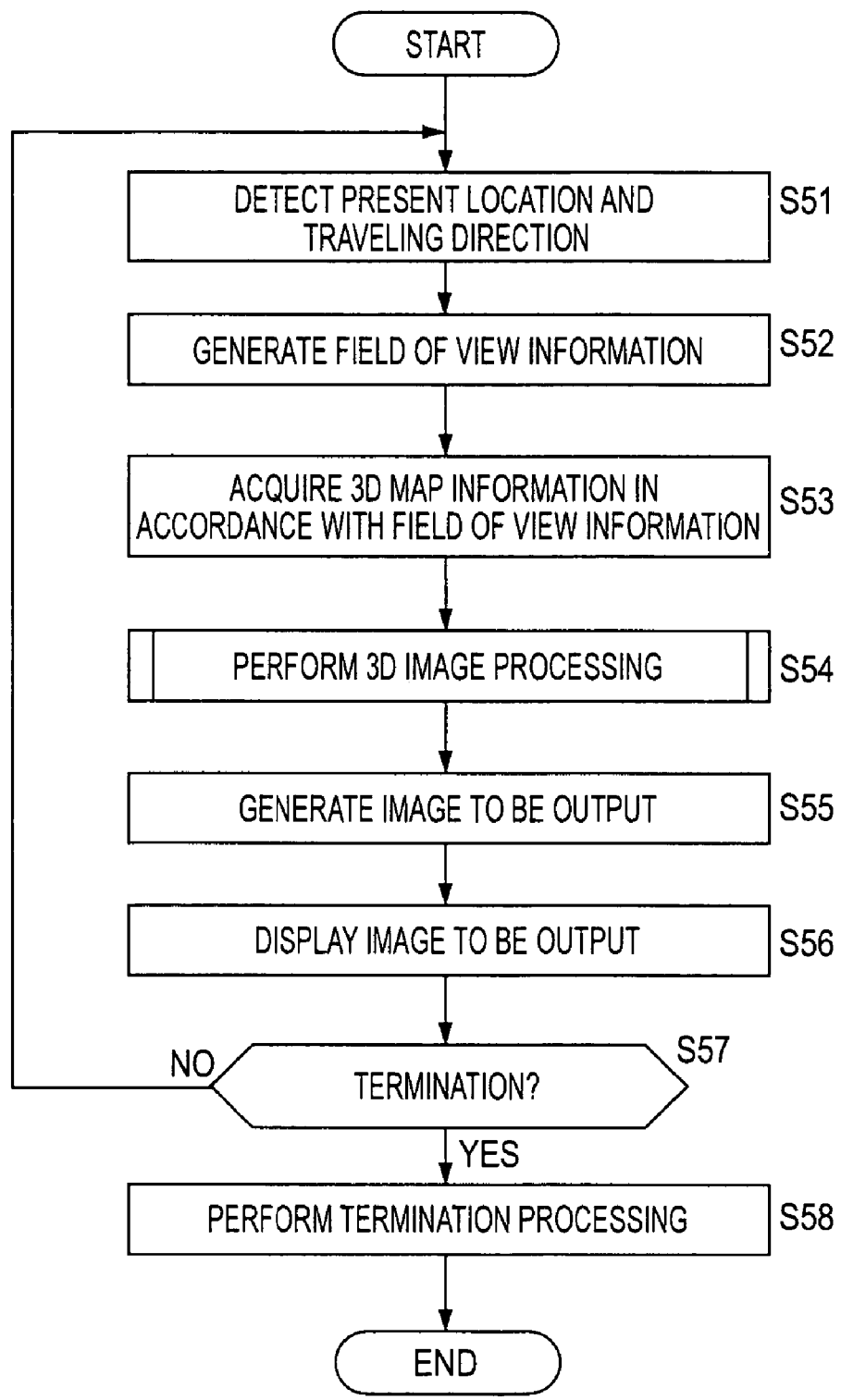
FIG. 13 is a flowchart of a navigation process.

A specific navigation process performed by the car navigation system 300 is described next with reference to a flowchart shown in FIG. 13.

In step S51, the positional information detector 301 detects the present location and the traveling direction. In step S52, the positional information detector 301 generates the field of view information 313 and supplies the field of view information 313 to the image processing apparatus 303. In step S53, the image processing apparatus 303 acquires the 3D map information 314, which is map information represented in three dimensions, from the map database 302 in accordance with the field of view information 313 supplied from the positional information detector 301.

In step S54, the image processing apparatus 303 performs 3D image processing. In this 3D image processing, the 3D image process described with reference to the flowchart shown in FIG. 9 is performed as a sub-flow. Since the processing details are similar to the flowchart shown in FIG. 9, the explanation is omitted here.

After the 3D image processing is performed and the output image 315 is generated and output in step S54, the map display device 304 including a display and the like acquires the output image 315. In step S55, the map display device 304 generates an image to be output in accordance with the output image 315 and the like. In step S56, the map display device 304 displays the image to be output.

After displaying the image to be output, the process proceeds to step S57. In step S57, the map display device 304 determines whether or not the navigation process should be terminated. If it is determined that the navigation process should not be terminated, the process returns to step S51 to repeat the subsequent processing. If it is determined that the navigation process should be terminated, the process proceeds to step S58. In step S58, the map display device 304 performs termination processing and terminates the navigation process.

As described above, when such image processing including adjustment processing for moving vertices is adapted for the car navigation processing, the car navigation system 300 is capable of showing a way and displaying the present location using an image in which vertices of a solid object are adjusted. Thus, a user is able to understand information on an object closer to the user in more detail. In addition, since such an image is formed as a 3D image with a point of view much closer to the actual field of view, the user is able to intuitively (more easily) understand the details of the image.

In other words, in known perspective, when an object is displayed in a wide angle, more distortion appears in a portion closer to an upper or lower end of an image. However, when an image processing method according to an embodiment of the present invention is performed for a 3D object, the car navigation system 300 is capable of displaying an object with a wide viewing angle without distortion, thus enabling the provision of an image that can be easily seen by the user.

In addition, when this method is performed for a 3D object, the car navigation system 300 is capable of displaying an object that is located farther than a target point smaller and displaying an object that is located closer than the target point larger.

The foregoing series of processing may be performed by hardware or software. In this case, for example, the image processing apparatus 101 shown in FIG. 5 may be formed as a personal computer 400 shown in FIG. 14.

Figure 14:
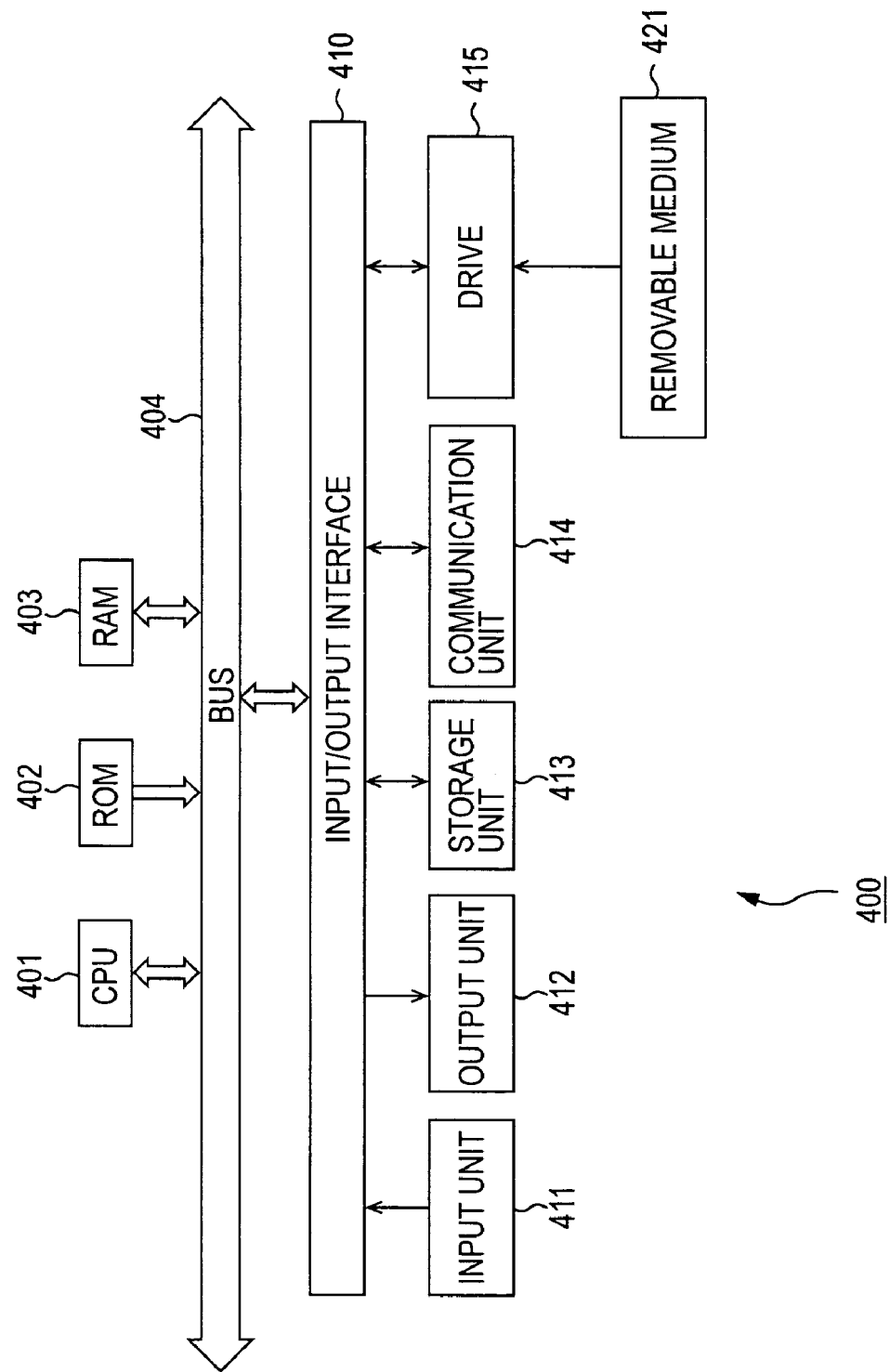
FIG. 14 shows an example of a personal computer according to an embodiment of the present invention.

Referring to FIG. 14, a central processing unit (CPU) 401 of the personal computer 400 performs various types of processing in accordance with a program stored in a read-only memory (ROM) 402 or a program loaded from a storage unit 413 to a random-access memory (RAM) 403. Data necessary for the CPU 401 to perform the various types of processing are stored appropriately in the RAM 403.

The CPU 401, the ROM 402, and the RAM 403 are connected to each other via a bus 404. An input/output interface 410 also is connected to the bus 404.

The input/output interface 410 is connected to an input unit 411 including a keyboard, a mouse, and the like an output unit 412 including a display, such as a cathode-ray tube (CRT) or a liquid crystal device (LCD), and a speaker, the storage unit 413, such as a hard disk, and a communication unit 414, such as a modem. The communication unit 414 performs communication via a network including the Internet.

A drive 415 is connected to the input/output interface 410 according to need. A removable medium 421, such as a magnetic disk, an optical disk, a magneto-optical disk, or a semiconductor memory, is appropriately installed on the drive 415. A computer program read from the removable medium 421 is installed on the storage unit 413 according to need.

When the series of foregoing processing is performed by software, a program constituting the software is installed via a network or a recording medium.

For example, as shown in FIG. 14, this recording medium not only includes the removable medium 421, such as a magnetic disk (including a flexible disk), an optical disk (including a compact disk-read only memory (CD-ROM) and a digital versatile disk (DVD)), a magneto-optical disk (including a MiniDisk (MD)), or a semiconductor memory, which records the program and is distributed in order to provide the program to a user independent of an apparatus main unit, but also includes the ROM 402 or the hard disk included in the storage unit 413, which records the program and is built in the apparatus main unit to be provided to the user.

In this specification, steps for a program recorded in the recording medium are not necessarily performed in chronological order in accordance with the written order. The steps may be performed in parallel or independently without being performed in chronological order.

In addition, in this specification, the system represents the whole equipment including a plurality of apparatuses.

It should be understood by those skilled in the art that various modifications, combinations, subcombinations and alterations may occur depending on design requirements and other factors insofar as they are within the scope of the appended claims or the equivalents thereof.

What is claimed is:

1. The information processing method for an information processing apparatus for generating a three-dimensional image on a display by projecting a three-dimensional space onto a plane, the information processing method comprising the steps of:
   determining a depth for each of a plurality of vertices of at least one polygon from a viewpoint in the three-dimensional space, the at least one polygon forming a surface of a three-dimensional object in the three-dimensional space;
   moving the position of at least a portion of the plurality of vertices in the three-dimensional space by the amount of movement relative to each determined depth for each of the plurality of vertices;
   rendering a three-dimensional image onto a plane by projecting the surface of the three-dimensional object in the three-dimensional space formed by the plurality of vertices; and
   detecting a relative position for each of the plurality of vertices with respect to a sight-line vector, the sight-line vector representing a direction of a field of view in the three-dimensional space;
   wherein the depth determining step determines the relative depth for each of the plurality of vertices with respect to the sight-line vector, the relative depth of each given vertex being a distance from the viewpoint to a location along the sight-line vector where a vector passing through the given vertex intersects the sight-line-vector at a perpendicular angle.

2. The information processing method of claim 1, wherein the depth determining step compares the relative depth of the vertex to a predetermined threshold value set in advance.

3. The information processing method of claim 1, wherein when the depth determining step determines that the relative depth of the given vertex is greater than that of a point representing a threshold value, the vertex moving means does not move the given vertex; and
   when the depth determining step determines that the relative depth of the given vertex less than the point representing the threshold value, the vertex moving means moves the given vertex by a distance based on the relative depth.

4. The information processing apparatus according to claim 3, wherein when the vertex moving step moves the given vertex, the moving step moves the given vertex by a distance proportional to the square of the value obtained by subtracting the relative depth of the vertex from the threshold value.

5. The information processing apparatus according to claim 3, wherein when the vertex moving step moves the vertex in a horizontal and vertical direction, the move in the horizontal direction and the move in the vertical direction are proportional to the square of the value obtained by subtracting the relative depth of the vertex from the threshold value.

6. The information processing apparatus according to claim 4, wherein when the vertex moving step moves the vertex in the horizontal and vertical direction, the move in the horizontal direction differs is distance from the move in the vertical direction.

7. The information processing apparatus according to claim 1, wherein:
   the vertex moving step moves the given vertex along a plane perpendicular to the sight-line vector which intersects the given vertex both before and after the moving step.

8. The information processing apparatus according to claim 7, wherein the amount of movement in a vertical direction and in a horizontal direction are independent of one another.

* * * * *

UNITED STATES PATENT AND TRADEMARK OFFICE
CERTIFICATE OF CORRECTION

| | | |
|---|---|---|
| PATENT NO. | : 7,420,558 B2 | Page 1 of 1 |
| APPLICATION NO. | : 11/242945 | |
| DATED | : September 2, 2008 | |
| INVENTOR(S) | : Izumi Urano et al. | |

It is certified that error appears in the above-identified patent and that said Letters Patent is hereby corrected as shown below:

Column 16, Line 36:
"is" should read -- in --.

Signed and Sealed this

Eleventh Day of November, 2008

JON W. DUDAS
*Director of the United States Patent and Trademark Office*